United States Patent

Bates

[11] Patent Number: 5,878,963
[45] Date of Patent: Mar. 9, 1999

[54] DRIP IRRIGATION TUBING SURFACE DISCONTINUITY DRIP EMITTER FLOW DISRUPTER

[76] Inventor: Roger E. Bates, 4201 Storm Ave., Yakima, Wash. 98908

[21] Appl. No.: 859,385

[22] Filed: May 20, 1997

[51] Int. Cl.$^6$ .................................................. B05B 15/00
[52] U.S. Cl. ............................................................. 239/542
[58] Field of Search ................................... 239/104, 120, 239/121, 542; 248/58, 61; 47/48.5

[56] References Cited

U.S. PATENT DOCUMENTS

| | | | |
|---|---|---|---|
| 2,291,148 | 7/1942 | Carson | 248/61 |
| 3,618,176 | 11/1971 | Barnes | 248/61 |
| 5,178,079 | 1/1993 | Hostetler | 248/61 |

FOREIGN PATENT DOCUMENTS

| | | | |
|---|---|---|---|
| 2365375 | 7/1978 | France | 239/542 |
| 2316866 | 3/1977 | Germany | 239/542 |
| 843871 | 7/1981 | U.S.S.R. | |

*Primary Examiner*—Kevin Weldon
*Attorney, Agent, or Firm*—Floyd E. Ivey

[57] ABSTRACT

A discontinuity at the surface of tubing which intercepts a stream of fluid flowing along the surface of the tubing causing the fluid to form drops and causing the drops to fall at an intended location. The invention addresses in particular the installation of drip irrigation systems in hillside applications where drip irrigation tubing may not be level. Heating and cooling of the drip irrigation tubing causes the tubing and drip emitters to rotate. The water from the emitter which is rotated to face away from the area where irrigation drip is to be applied emerges as a stream and flows along the surface of the drip irrigation tubing until it encounters a slope which causes a drop to form. The failure of the water to form drops and fall at the position of the drip emitter and rather to flow along the tubing results in a loss of irrigation to the particular plant serviced by an emitter. Plants are thus subject to stress and reduced production. The formation within the tubing surface, of a discontinuity where the slope increases causing formation of drops, or the placement of a plastic disk having an aperture around the tubing forming a discontinuity serves to control the unwanted stream and permits direction of the drip irrigation to the desired location.

15 Claims, 3 Drawing Sheets

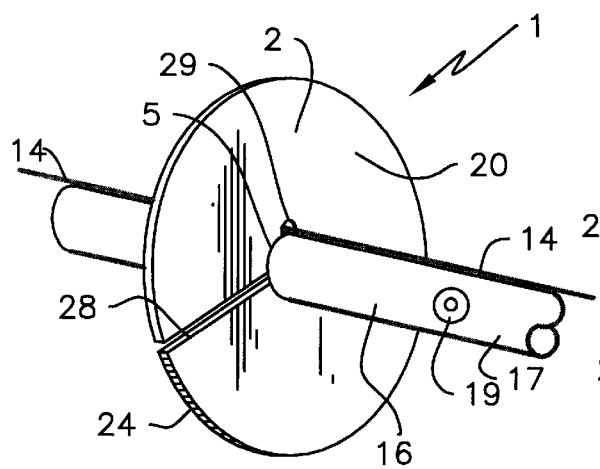
Fig. 1
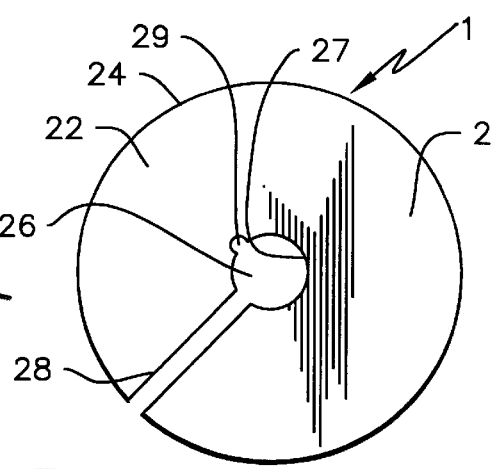
Fig. 2
Fig. 3
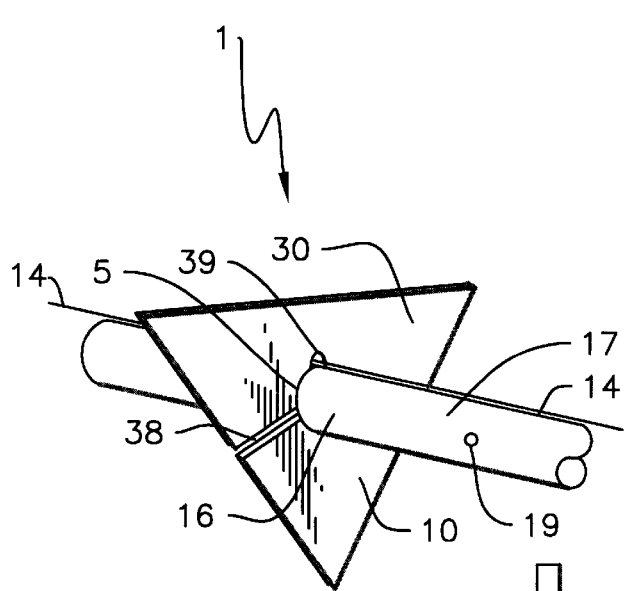
Fig. 4
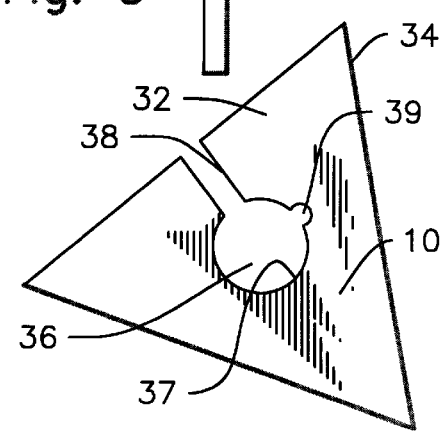
Fig. 5
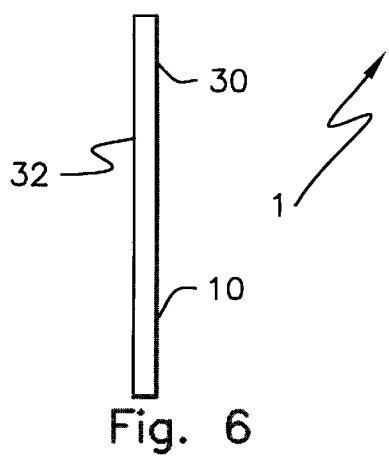
Fig. 6

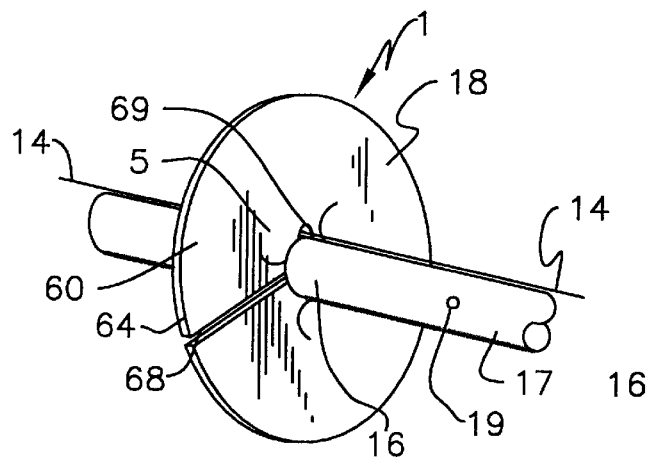
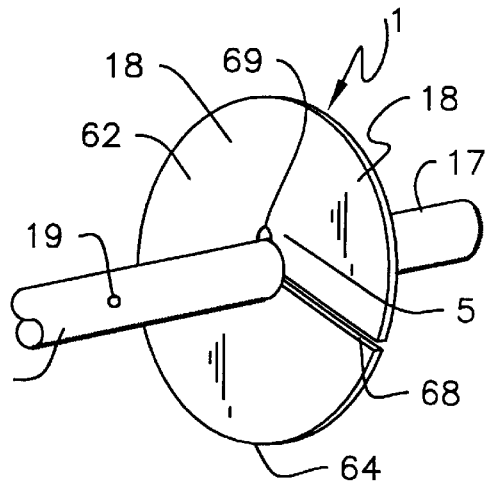
Fig. 12
Fig. 13
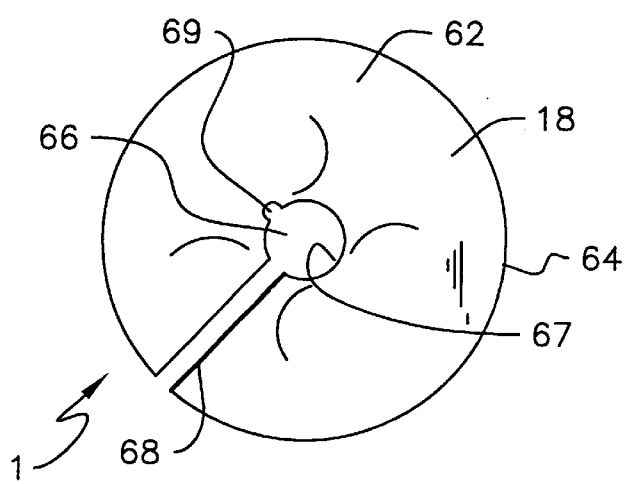
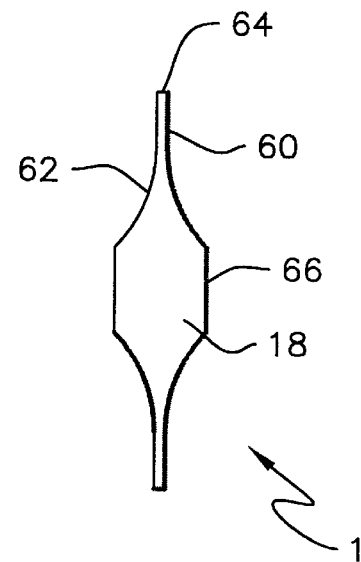
Fig. 14
Fig. 15

DRIP IRRIGATION TUBING SURFACE DISCONTINUITY DRIP EMITTER FLOW DISRUPTER

FIELD OF THE INVENTION

The present invention relates generally to irrigation systems and particularly to drip irrigation systems and the means of directing the drip irrigation to the desired location.

BACKGROUND OF THE INVENTION

Drip irrigation systems comprised generally of flexible plastic tubing with periodic drip emitters affixed through the tubing wall or spaced apart within the tubing, are commonly used for the irrigation of orchards and vineyards. One or more drip emitters are directed to the irrigation of each plant. Vineyard applications of the drip irrigation method may be employed with the tubing hung or strung above the ground by affixing tubing to a wire positioned essentially parallel to the ground. A variety of clip devices are available to affix tubing to the wire. The tubing and emitter is installed to insure that the drip irrigation, for a particular plant, falls from the emitter into that plant's root zone. Heating and cooling of the drip irrigation tubing frequently causes the tubing to rotate thus changing the orientation of the emitter. The drip emitter orientation is not of particular consequence where the tubing as installed is level. With the tubing level the water emitted from the drip emitter will emerge from the emitter and form a drop which will fall from either the emitter or the tubing. However, installation of tubing for irrigation of plants on hill sides frequently results in a tubing installation wherein the tubing is not level. Rotation of tubing and emitter, where the tubing is not level, frequently results in a rotation of the positioning of the drip emitter. Where the tubing is not level and the drip emitter faces up or away from the area to be irrigated the resulting stream of water from the emitter flows along the tubing until an obstruction is encountered or the tubing levels sufficiently to cause the water to form a drop and then spill or drip from the tubing. The failure thus realized is that the water is not applied at the point intended. A consequence is the reduced or eliminated irrigation for particular plants resulting in stress, reduced productivity and plant damage or death. A long felt need within irrigation is the ability to cause drip irrigation methods to insure application in the plant root zone when irrigating in the hillside setting or in any circumstance where drip irrigation tubing is not level.

SUMMARY OF THE INVENTION

The present invention discloses an apparatus or article of manufacture forming a discontinuity in the surface of tubing which will disrupt a stream of water or other fluid causing the formation and fall of drops at an intended point being, in the case of irrigation, the point intended for irrigation. In accordance with the present invention, an apparatus or article of manufacture forms at least one discontinuity in the surface of tubing, including drip irrigation tubing, at or near the point where the operator intends the drip irrigation to occur from an emitter, drip emitters for drip irrigation systems and other emitters, devices of defects which allow leaks of fluids. The discontinuity is created by a tubing surface artifact which increases the slope at the tubing surface toward the area intended for irrigation. The increased slope intercepts the stream of water traversing the surface of the tubing causing the formation of a water drop thereby effecting irrigation at the desired location. The desired effect of a discontinuity, creating an area with increased slope, is realized by the attachment of an apparatus at the point where the drip is to occur or by the forming the equivalent apparatus or discontinuity in the drip irrigation tubing surface at the time of manufacture of the tubing.

The preferred embodiment of the apparatus is a semi-rigid plastic disk, generally flat and circular in shape with a first and second side, having a centrally positioned aperture extending from the first to the second side with an aperture perimeter, a notch in the aperture perimeter and a slit from the aperture perimeter to the apparatus perimeter. The slit permits the apparatus to be separated at the slit and slipped over the tubing so that the tubing is received into the aperture. The aperture is sized to receive the tubing but be secure about the tubing perimeter so as to insure disruption of a stream of water flowing along the tubing surface in the drip irrigation system hillside installation or where the tubing is not level. The stream of water, in such circumstance, flows down the tubing into contact with the apparatus, down the apparatus first or second side forming drops at the apparatus perimeter which then fall to the intended point of irrigation. The notch in the aperture perimeter is sized to receive wire upon which drip irrigation tubing is hung and serves the function otherwise provided by a clip.

Alternatively the apparatus may be of any regular geometric shape or of an irregular shape having the requisite aperture and slit for application to the drip irrigation tubing. Such alternative embodiments may have a variety of cross sections including but not limited to rectangular and circular, as for example in a toroidal shaped embodiment. The apparatus may be of plastic or other equivalent materials with flexibility to permit the separation of the disk or apparatus at the slit to permit the tubing to be received into the aperture. The material will be elastic or have other properties causing the slit to close or permitting the disk or other shape to be bent closing the slit and insuring that the apparatus will remain in position on the tubing. An alternative embodiment of the invention is the formation of a discontinuity in the perimeter of the drip irrigation tubing, proximal to the drip emitter, which disrupts the unwanted stream causing the formation of water drops. The aperture of each of the embodiments is not constrained to be centrally positioned in relation to the shape of the apparatus but needs only to be located such that a portion of the apparatus creates a discontinuity at the tubing perimeter.

The apparatus disclosed thus forms a discontinuity along the tubing surface which disrupts the unwanted stream of water and causes the formation of drops and hence irrigation at the desired point.

BRIEF DESCRIPTION OF THE DRAWINGS

The foregoing and other features and advantages of the present invention will become more readily appreciated as the same become better understood by reference to the following detailed description of the preferred embodiment of the invention when taken in conjunction with the accompanying drawings, wherein:

FIG. 1 is an isometric drawing of a disk shaped embodiment of the invention showing the first side, perimeter, slit, notch and drip irrigation tubing and drip emitter.

FIG. 2 is a plan view of a disk shaped embodiment of the invention showing the second side, disk perimeter, aperture, aperture perimeter, notch and slit.

FIG. 3 is an edge view of a disk shaped embodiment of the invention showing the disk perimeter and first and second sides.

FIG. 4 is an isometric drawing of a regular geometric shaped embodiment of the invention showing the first side, perimeter, slit, notch and drip irrigation tubing and drip emitter.

FIG. 5 is a plan view of a regular geometric shaped embodiment of the invention showing the second side, perimeter, aperture, aperture perimeter, notch and slit.

FIG. 6 is an edge view of a regular geometric shaped embodiment of the invention showing the perimeter and first and second sides.

FIG. 12 is an isometric drawing of an alternative disk shaped embodiment of the invention showing the first side, perimeter, slit, notch and drip irrigation tubing and drip emitter.

FIG. 13 is an isometric drawing of an alternative disk shaped embodiment of the invention showing the second side, perimeter, slit, notch and drip irrigation tubing and drip emitter.

FIG. 14 is a plan view of an alternative disk shaped embodiment of the invention showing the second side, perimeter, aperture, aperture perimeter, notch and slit.

FIG. 15 is an edge view of an alternative disk shaped embodiment of the invention showing the perimeter, first and second sides and aperture.

DETAILED DESCRIPTION

Figure 7:
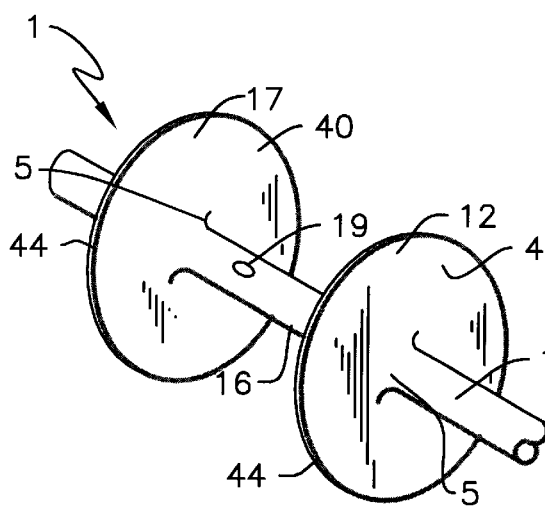
FIG. 7 is an isometric of a disk shaped embodiment of the invention as formed in the manufacturing process as an integral part of drip irrigation tubing. Shown is the first side, perimeter, drip irrigation tubing and drip emitter.
Figure 8:
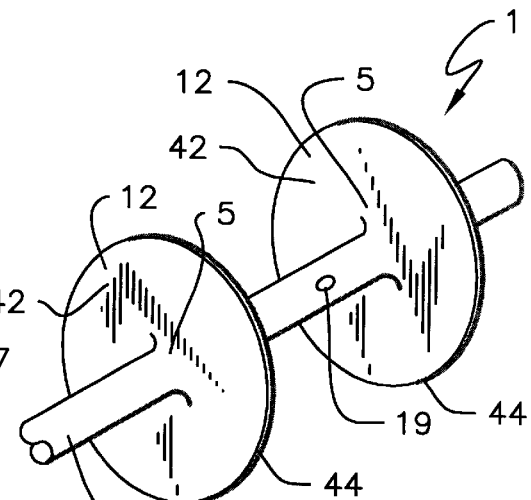
FIG. 8 is an isometric of a disk shaped embodiment of the invention as formed in the manufacturing process as an integral part of drip irrigation tubing. Shown is the second side, perimeter, drip irrigation tubing and drip emitter.
Figure 9:
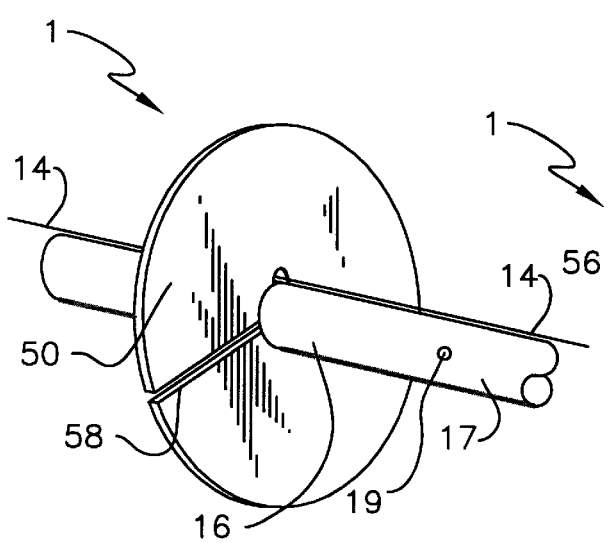
FIG. 9 is an isometric of a toroidal shaped embodiment of the invention showing the surface, slit, notch and drip irrigation tubing and drip emitter.
Figure 10:
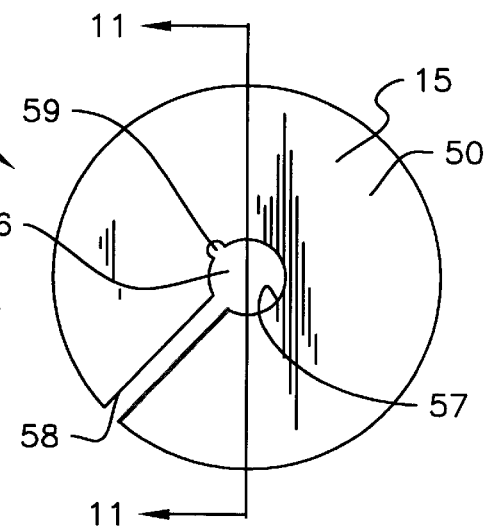
FIG. 10 is a plan view of a toroidal shaped embodiment of the invention showing the surface, aperture, aperture perimeter, notch and slit.
Figure 11:
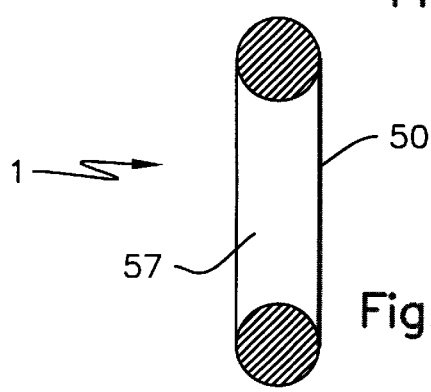
FIG. 11 is a section view of section 11—11 shown FIG. 10 of a toroidal shaped embodiment of the invention showing the surface and aperture perimeter.

The drip irrigation tubing surface discontinuity drip emitter flow disrupter 1 disclosed herein is illustrated in FIG. 1 through 15. FIGS. 1, 2 and 3 illustrate the preferred embodiment of the apparatus wherein a discontinuity 5 is formed by a semi-rigid plastic disk 2, generally flat and circular in shape with a first and second side 20, 22, a perimeter 24, an aperture 26 extending from the first to the second side 20, 22 with an aperture perimeter 27 and a notch 29 in the aperture perimeter 27. A slit 28 extends from the aperture perimeter 27 to the perimeter 24. The slit 28 permits the disk 2 to be separated at the slit 28 and slipped over the tubing 16 so that the tubing 16 is received into the aperture 26. The aperture 26 is sized to receive the tubing 16 but be secure about the tubing perimeter 16A so that the stream of fluid flowing along the tubing surface 17 flows into contact with the discontinuity 5, down the apparatus first or second side 20, 22 forming drops at the apparatus perimeter 24 which then fall to the intended point. The relationship between the discontinuity 5 and the tubing perimeter 16A is in contact such as to insure disruption of a stream of fluid flowing along the tubing surface 17 in the drip irrigation system hillside installation or where the tubing 16 is not level. The stream of water, in such circumstance, flows down the tubing 16 into contact with the apparatus, down the apparatus first or second side forming drops at the apparatus perimeter which then fall to the intended point of irrigation.

Alternatively the apparatus may be of any regular geometric 10 shape, for example as shown in FIGS. 4, 5 and 6, or of an irregular shape having a first and second side 30, 32, a perimeter 34, an aperture 36 with aperture perimeter 37, notch 39 and slit 38.for application to the drip irrigation tubing. Such alternative embodiments may have a variety of cross sections including but not limited to rectangular and circular. The apparatus in any embodiment may be of plastic or other equivalent materials with flexibility to permit the separation of the disk or apparatus at the slit to permit the tubing to be received into the aperture. The material will be elastic or have other properties causing the slit to close or permitting the disk or other shape to be bent closing the slit and insuring that the apparatus will remain in position on the tubing.

The present invention discloses an apparatus or article of manufacture forming a discontinuity 5 in the surface of the tubing which will disrupt a stream of water or other fluid causing the formation and fall of drops of fluid at the point intended. In accordance with the present invention, an apparatus or article of manufacture forms at least one discontinuity 5 in the tubing surface 17 of drip irrigation tubing 16 at or near the point where the operator intends the drip irrigation to occur from an emitter 19. The discontinuity 5 is created by a tubing surface 17 artifact which increases the slope at the tubing surface 17 toward the area intended for irrigation. The increased slope intercepts the stream of water traversing the surface 17 of the tubing 16 causing the formation of a water drop thereby effecting irrigation at the desired location. The desired effect of a discontinuity 5, creating an area with increased slope, is realized by the attachment of an apparatus at the point where the drip is to occur or by the forming of the equivalent apparatus or discontinuity 5 in the drip irrigation tubing surface 17 at the time of manufacture of the tubing. This alternative embodiment of the invention, by the formation of a discontinuity 5, as a surface shape 12, is formed in the tubing 16 as a part of the manufacture of the tubing 16, in the tubing surface 17 at the tubing perimeter 16A of the drip irrigation tubing 16, proximal to the drip emitter 19. The surface shape 12 has a first and second side 40, 42 and a perimeter 44. The discontinuity 5 thus formed disrupts an unwanted stream causing the formation of water drops. Alternative embodiments of the surface artifact formation of the discontinuity may have a variety of cross sections and shapes.

An alternative embodiment is toroidal 15 in shape having a surface 50, a centrally positioned aperture 56 with an aperture perimeter 57, notch 59 and a slit 58 extending from the aperture perimeter 57 to the surface 50. A discontinuity 5 is formed where the aperture perimeter 57 receives the tubing 16. An additional embodiment is concave 18 and generally disk shaped having a first and second side 60, 62, a perimeter 64, a centrally positioned aperture 66 with a aperture perimeter 67 and a slit 68 from the aperture perimeter 67 to the perimeter 64. In this embodiment the first and second sides 60, 62 are concave from the aperture 66 to the perimeter 64.

FIGS. 1, 4, 9 and 12 show the notch 29, 39, 59, 69 receiving a wire 14 as occurs in vineyard applications for drip irrigation system mounting.

While a preferred embodiment of the present invention has been shown and described, it will be apparent to those skilled in the art that many changes and modifications may be made without departing from the invention in its broader aspects. The appended claims are therefore intended to cover all such changes and modifications as fall within the true spirit and scope of the invention.

I claim:

1. A drip irrigation tubing surface discontinuity drip emitter flow disrupter comprising:

A. A drip irrigation tubing having a tubing surface and a tubing perimeter; a drip emitter; at least one discontinuity formed at the tubing perimeter which increases the slope at the tubing surface toward the area intended for irrigation disrupting a stream of fluid along the tubing surface causing the formation of drops.

2. A drip irrigation tubing surface discontinuity chip emitter flow disrupter according to claim 1 wherein:

A. a disk having a first and second side, a disk apparatus perimeter, an aperture extending from the first to the second side having an aperture perimeter; the aperture sized to receive the tubing; a notch at the aperture perimeter;

B. the at least one discontinuity is formed by the contact between the aperture perimeter and the tubing surface.

3. A drip irrigation tubing surface discontinuity drip emitter flow disrupter according to claim 2 wherein:

A. a slit extending from the aperture perimeter to the apparatus perimeter permits the disk to be separated at the slit and slipped over the tubing so that the tubing is received into the aperture.

4. A drip irrigation tubing surface discontinuity drip emitter flow disrupter according to claim 3 wherein:

A. the aperture is sized to receive the tubing so that the aperture perimeter is secure about the tubing perimeter so that the stream of fluid flowing along the tubing surface flows into contact with the at, least one discontinuity, down the disk first or second side forming drops at the apparatus perimeter which then fall to the intended point; the notch is sized to receive a wire for mounting;

B. the disk is composed of a semi-rigid material.

5. A drip irrigation tubing surface discontinuity drip emitter flow disrupter according to claim 1 wherein:

A. a regular geometric shape having a first and second side, a disk apparatus perimeter, an aperture extending from the first to the second side having an aperture perimeter; the aperture sized to receive the tubing; a notch at the aperture perimeter;

B. the at least one discontinuity is formed by the contact between the aperture perimeter and the tubing surface.

6. A drip irrigation tubing surface discontinuity drip emitter flow disrupter according to claim 5 wherein:

A. a slit extending from the aperture perimeter to the apparatus perimeter permits the regular geometric shape to be separated at the slit and slipped over the tubing so that the tubing is received into the aperture.

7. A drip irrigation tubing surface discontinuity drip emitter flow disrupter according to claim 6 wherein:

A. the aperture is sized to receive the tubing so that the aperture perimeter is secure about the tubing perimeter so that the stream of fluid flowing along the tubing surface flows into contact with the at least one discontinuity, down the first or second side forming drops at the apparatus perimeter which then fall to the intended point; the notch is sized to receive a wire for mounting;

B. the disk is composed of a semi-rigid material.

8. A drip irrigation tubing surface discontinuity drip emitter flow disrupter according to claim 1 wherein:

A. a disk having a concave having a first and second side, a disk apparatus perimeter, an aperture extending from the first to the second side having an aperture perimeter; the aperture sized to receive the tubing; a notch at the aperture perimeter;

B. the at least one discontinuity is formed by the contact between the aperture perimeter and the tubing surface.

9. A drip irrigation tubing surface discontinuity drip emitter flow disrupter according to claim 8 wherein:

A. a slit extending from the aperture perimeter to the apparatus perimeter permits the disk with concave first and second side s to be separated at the slit and slipped over the tubing so that the tubing is received into the aperture.

10. A drip irrigation, tubing surface discontinuity drip emitter flow disrupter according to claim 9 wherein:

A. the aperture is sized to receive the tubing so that the aperture perimeter is secure about the tubing perimeter so that the stream of fluid flowing along the tubing surface flows into contact with the at least one discontinuity, down the disk first or second side forming drops at the apparatus perimeter which then fall to the intended point; the notch is sized to receive a wire for mounting;

B. the disk having concave first and second sides is composed of a semi-rigid material.

11. A drip irrigation tubing surface discontinuity drip emitter flow disrupter according to claim 1 wherein:

A. a toroid having a surface, a toroid aperture therein having an aperture perimeter; the aperture sized to receive the tubing; a notch at the aperture perimeter;

B. the at least one discontinuity is formed by the contact between the aperture perimeter and the tubing surface.

12. A drip irrigation tubing surface discontinuity drip emitter flow disrupter according to claim 11 wherein:

A. a slit extending from the aperture perimeter to the surface permits the toroid to be separated at the slit and slipped over the tubing so that the tubing is received into the aperture.

13. A drip irrigation tubing surface discontinuity drip emitter flow disrupter according to claim 12 wherein:

A. the aperture is sized to receive the tubing so that the aperture perimeter is secure about the tubing perimeter so that the stream of fluid flowing along the tubing surface flows into contact with the at least one discontinuity, down the toroid surface forming drops at the apparatus perimeter which then fall to the intended point; the notch is sized to receive a wire for mounting;

B. the toroid is composed of a semi-rigid material.

14. A drip irrigation tubing surface discontinuity drip emitter flow disrupter comprising:

A. A drip irrigation tubing having a tubing surface and a tubing perimeter; a drip emitter; at least one discontinuity formed at the tubing surface disrupting a steam of fluid along the tubing surface causing the formation of drops;

B. the least one discontinuity is created by a tubing surface artifact formed as a surface shape which increases the slope at the tubing surface toward the area intended for application of the fluid.

15. A drip irrigation tubing surface discontinuity drip emitter flow disrupter according to claim 14 wherein:

A. the surface shape has a first and second side and a perimeter; the at least one discontinuity formed disrupts an unwanted stream causing the formation of drops of fluid.

* * * * *